United States Patent [19]
Klingelhofer

[11] Patent Number: 5,884,099
[45] Date of Patent: Mar. 16, 1999

[54] CONTROL CIRCUIT FOR A BUFFER MEMORY TO TRANSFER DATA BETWEEN SYSTEMS OPERATING AT DIFFERENT SPEEDS

[75] Inventor: Marc Klingelhofer, Redwood City, Calif.

[73] Assignee: Sun Microsystems, Inc., Mountain View, Calif.

[21] Appl. No.: 655,850

[22] Filed: May 31, 1996

[51] Int. Cl.[6] .................................................. G06F 3/00
[52] U.S. Cl. .......................... 395/872; 395/877; 395/878; 395/892
[58] Field of Search ................................ 398/870–880; 711/120–156; 365/49, 221

[56] References Cited

U.S. PATENT DOCUMENTS

| | | | |
|---|---|---|---|
| 4,463,443 | 7/1984 | Frankel et al. | 395/880 |
| 4,785,415 | 11/1988 | Karlquist | 395/552 |
| 4,860,193 | 8/1989 | Bently et al. | 395/875 |
| 4,862,419 | 8/1989 | Hoberman | 365/211 |
| 4,864,543 | 9/1989 | Ward et al. | 365/211 |
| 4,891,788 | 1/1990 | Krefels | 365/49 |
| 5,406,554 | 4/1995 | Parry | 370/58.1 |
| 5,471,581 | 11/1995 | Munier et al. | 711/156 |
| 5,499,344 | 3/1996 | Elnashar et al. | 395/308 |
| 5,504,927 | 4/1996 | Okamoto et al. | 395/878 |
| 5,508,679 | 4/1996 | McClure | 340/146.2 |
| 5,587,953 | 12/1996 | Chung | 365/220 |
| 5,590,304 | 12/1996 | Adkisson | 711/100 |
| 5,592,629 | 1/1997 | Gamble | 395/871 |
| 5,668,767 | 9/1997 | Barringer | 365/221 |

OTHER PUBLICATIONS

"1994 – Data Book – Specialized Memories & Modules", Integrated Device Technology, Inc.

"High Performance Data Book–SRAMs, PROMs, PLDs, FPGAs, DataCom, Modules, ECL TTL", Cypress Semiconductor, Aug. 1993.

*Primary Examiner*—Christopher B. Shin
*Attorney, Agent, or Firm*—Blakely Sokoloff Taylor & Zafman

[57] ABSTRACT

The present invention relates to a simplified flag control circuitry for use in first in first out (FIFO) memory buffers. The special FIFO memory buffer transfers data between circuits running on different clocks. The present invention delays the initial output of data from the FIFO memory buffer until the memory buffer has received a threshold amount of data. After the threshold quantity of data has been received, the present invention allows output of data from the FIFO.

18 Claims, 12 Drawing Sheets

CONTROL CIRCUIT FOR A BUFFER MEMORY TO TRANSFER DATA BETWEEN SYSTEMS OPERATING AT DIFFERENT SPEEDS

BACKGROUND OF THE INVENTION

1. Field of the Invention

The present invention relates to a method and apparatus for transferring data between systems running at different clock rates. More specifically, the present invention relates to simplifying the flag control circuitry of a first in first out memory buffer which transfers data between a source system running at one clock rate, and a destination system running at a different clock rate.

2. Description of Related Art

A First-in, first-out (FIFO) buffer or memory unit can be used to temporarily store information for transfer between two circuits running at different clock rates. Separate input and output terminals on the FIFO allow data to be input into the FIFO at one clock rate and output from the FIFO at a different clock rate. Thus when placed between a source unit and a destination unit running on two different clock rates, the FIFO can match data flow between the two units by accepting data from a source unit at one rate of transfer and delivering data to a destination unit at a different rate. In particular if the source unit is slower than the destination unit, the FIFO can be filled with data at a slower rate and later emptied at a higher rate. Conversely, if the source unit is temporarily faster than the destination unit, the FIFO may store the bursts of data and output the data in the time interval between bursts.

Limited memory size requires that the aggregate data transferred into the FIFO and the aggregate data removed from the FIFO be approximately equivalent. Thus if the cumulative input of data into the FIFO significantly exceeds the cumulative output of data by the FIFO, memory overflow can result. Conversely, if the cumulative output of data from the FIFO exceeds the cumulative inflow of data over a significant period of time, memory underflow or the emptying of the FIFO memory and the output of invalid data may result. Thus to prevent either of these conditions from occurring, conventional asynchronous FIFOs use flag circuitry to indicate their status.

Conventional flag circuitry includes logic which continuously compares the values of the input and output data pointers and indicates when they are close (FIFO emptying) or distant (FIFO filling). Copies of the input (write) and output (read) pointers are synchronized and continuously compared. The comparison logic in the flag circuitry provides flexible status information, which may include multiple threshold information, as well as indicators which warn when the FIFO is empty or when the FIFO is full.

The primary problem with current flag circuitry is that complex comparison circuitry is required. The comparators themselves are complicated logic. Synchronization logic which enables comparison between the two time domains also adds to circuit complexity. In small FIFOs the complexity of the overhead logic is excessive.

Larger circuits suffer less from the overhead created by conventional flag circuitry because the increase in number of logic elements in a comparator and synchronization logic circuit is proportional to the base-2 logarithm of the FIFO size. The slow increase in computational requirements makes conventional FIFO flag logic acceptable for large FIFOs; however, in small FIFOs the complexity of the comparators and synchronizers can significantly exceed the complexity of the FIFO RAM and pointers. Small FIFOs are commonly used in video systems where close synchronization between different clocks make large FIFOs unnecessary The complicated circuitry used to generate control flags for large FIFOs requires significant resources and is inefficient, particularly in applications where small FIFOs are used. Thus a simple and reliable flag control method for use in small FIFO memories is needed.

SUMMARY OF THE INVENTION

The present invention discloses an apparatus and method for a rubber-band FIFO flag control circuit for use in small FIFOs. Rubber-band FIFOs are commonly used when a FIFO's input (source) and output (destination) clocks are sufficiently locked together to guarantee that, once a certain minimum amount of data has been input, data output can commence with no further checks of the FIFO status. FIFO size and threshold boundaries are determined by how closely locked are the input and output clocks.

Prevention of FIFO underflow requires that a FIFO contain at least "N" input data words, such that the output clock must not advance with respect to the input clock by more than N*360 degrees of phase. Prevention of the overflow condition requires that once the FIFO is "partially full" with "N" input data words, the input clock must not advance with respect to the output clock by more than (FIFO size−N)*360 degrees of phase. Given the maximum phase an input clock can lead and lag the output clock, and two equations, the minimum FIFO size and threshold "N" can be calculated. Smaller phase variances between the output clock and the input clock allow smaller FIFOs to be used.

The simple threshold FIFO disclosed uses a flag circuit to delay the output of the main FIFO RAM until a predetermined or threshold amount of data is input into the main FIFO RAM. In one embodiment the flag control circuit utilizes a flag memory device, which may be a shift register. The flag memory device is connected so that when a word of data enters the main FIFO RAM, a unit of data also enters the flag memory device. After a predetermined threshold quantity of data has entered the flag memory device, a signal is sent to the main FIFO RAM which then begins to output stored data. In alternate embodiments, the flag memory device may be replaced with a counter or other appropriate delay mechanism.

The preferred embodiment of the invention centers on using a flag memory device in the flag control circuit to adjust the address counters of the main FIFO such that at an initial time, the input counter (which determines the memory address in which data is input into the main FIFO RAM) leads the output counter (which determines the memory address at which data is output from the main FIFO RAM) by a threshold value. Thus the FIFO input address lines "lead" the output FIFO address lines by the threshold number of input clock cycles at an initial time.

Once a FIFO flag circuit detects the threshold condition, the flag circuit sends a signal which allows FIFO input to continue and FIFO output to begin. If the output clock and the input clock "are sufficiently locked", it can be guaranteed that the FIFO will never underflow nor overflow and the current invention no longer needs to monitor the FIFO main RAM. Thus, the expensive comparison and synchronization logic which is used in prior art flag circuits is unnecessary.

The disclosed FIFO is particularly useful in phase-locked-loop systems. The phase variance between input and output clocks in such systems often vary by less than ±1000.

The small phase variance makes practical sixteen word FIFOs with thresholds of eight words or less.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

Figure 1:
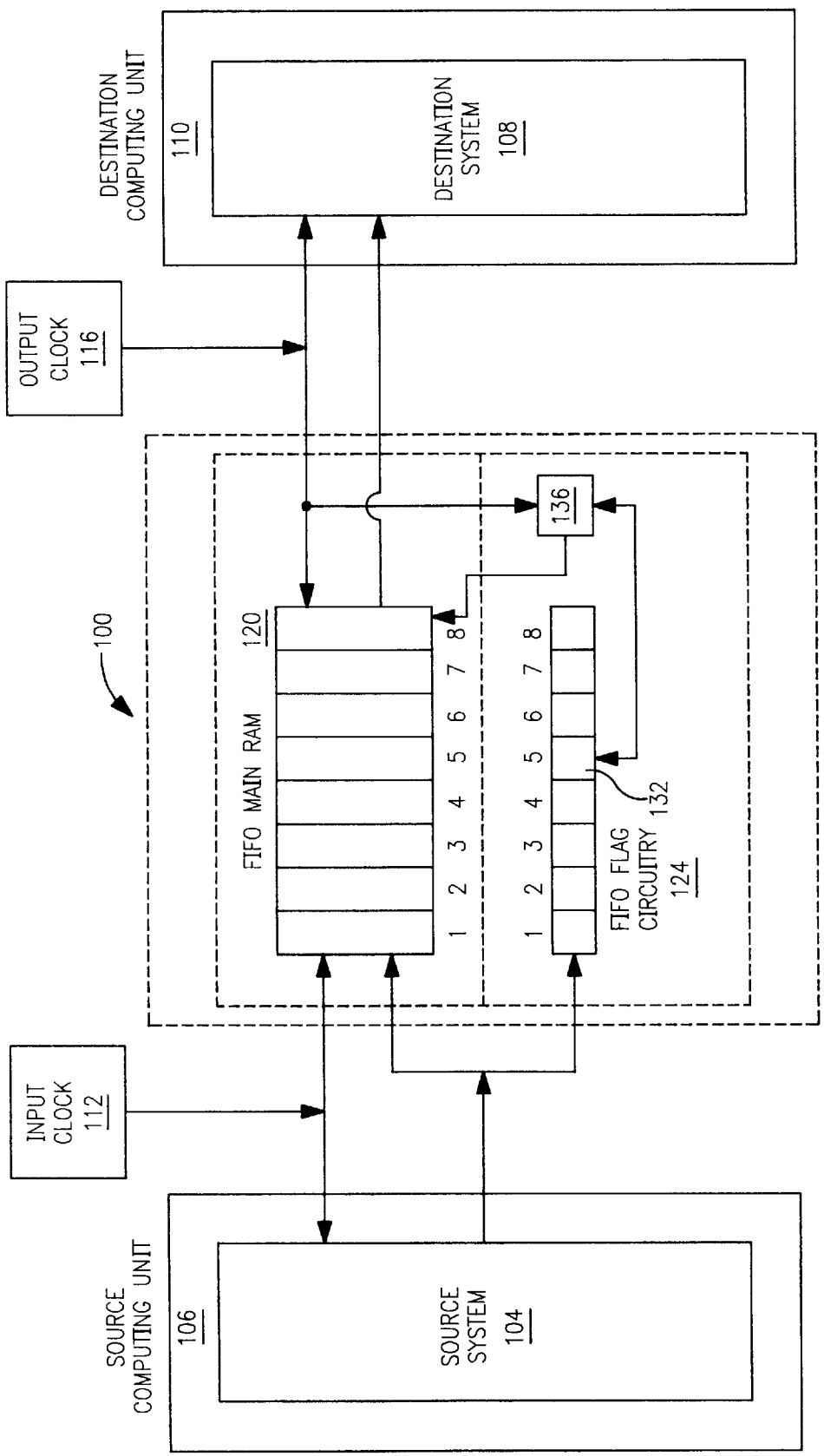
FIG. 1 shows a conceptual view of the operation of a rubber band FIFO with simple threshold flag circuit.

FIG. 1 shows a conceptual schematic of the Applicant's invention in operation.

The First-In-First-Out (FIFO) circuit 100 is designed to transfer data from a first system or source 104 to a destination system 108. A source or input clock 112 determines the rate of data input into the FIFO 100 as well as the clock rate of source system 104. The source system may be part of an overall source computing unit 106 which includes a memory, a processor and bus lines connecting the various components. The source computing unit may further include components such as disk drives and ROM memory.

The destination or output clock 116 sets timing for the destination system 108 as well as determining the rate of data output from the FIFO 100. The destination system may also be part of a destination computing unit 110 which includes a second processor, memory and bus lines. The destination computing unit may also include components such as disk drives and ROM memory.

The input clock 112 and the output clock 116 are related such that the phase difference between the two clocks satisfies two relationships expressed by (1) input clock≦(FIFO size−N)*360°+output clock and (2) output clock≦N *360°+input clock where N=the number of threshold elements.

The FIFO 100 is divided into a main RAM section 120 and a control circuit, hereinafter a flag circuit 124. A data store, which may be a main RAM 120, is used for storage of the data or words being transferred from the source to the destination. The flag circuit 124 is a delay circuit and may be implemented using a variety of conventional circuit elements including but not limited to using a counter, a shift register, or a dual port RAM. In FIG. 1, a shift register implementation of the preferred embodiment is shown. At initial start-up, the flag circuit 124 is reset to an empty or de-asserted state. When data is first input into the main RAM 120 a corresponding position in the flag memory of the flag circuit 124 is filled or asserted. Initially, no output is performed by FIFO 100. Once a threshold memory cell 132 in the flag memory of the flag circuit 124 is filled or asserted, a ready signal is generated. Synchronization circuitry 136 adjusts the FIFO flag circuitry 124 timing such that the ready signal enables output from FIFO 100 to begin.

Figure 2:
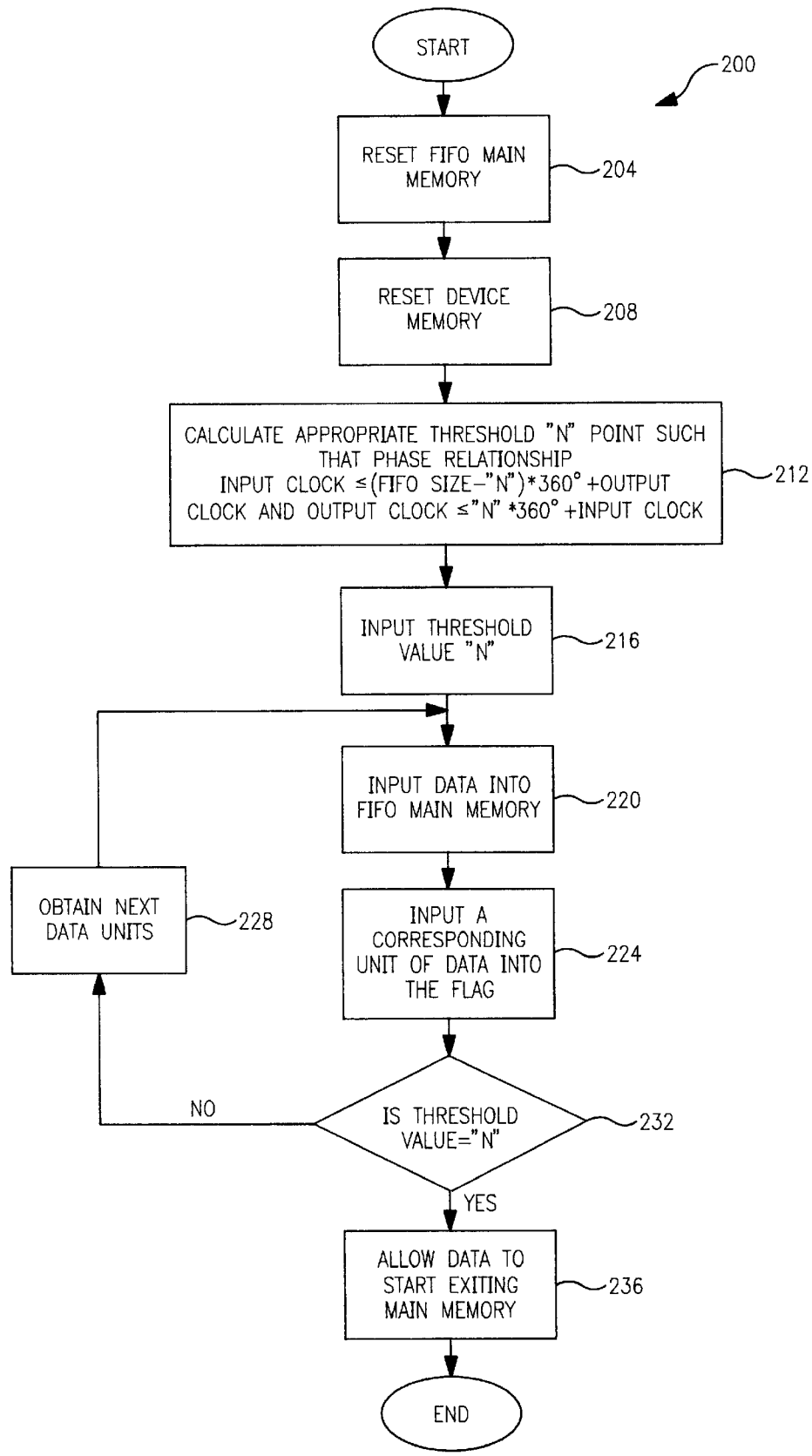
FIG. 2 shows a flowchart of the procedures used to implement the FIFO of FIG. 1.

FIG. 2 shows a flow chart 200 outlining the general operation of Applicant's invention. The main RAM 120 is reset and the flag circuit 124 is initialized in steps 204 and 208.

A threshold value "N" (where N is a number of input words) is chosen (step 212) and input into the flag circuitry in step 216. The threshold value is chosen such that the following phase relationship conditions are always met:

Input clock≦(FIFO size−N)*360°+output clock
and
output clock≦N*360°+input clock.

Data words are input into main RAM 120 in step 220. Every word entry is accompanied by the input of a corresponding unit of data into the flag circuit 124 at step 224. The process is repeated in step 228 until a threshold number of words, "N" is input into main RAM 120 in step 232. Once the threshold value is reached, FIFO 100 starts outputting data words from main RAM 120 in step 236.

Figure 3:
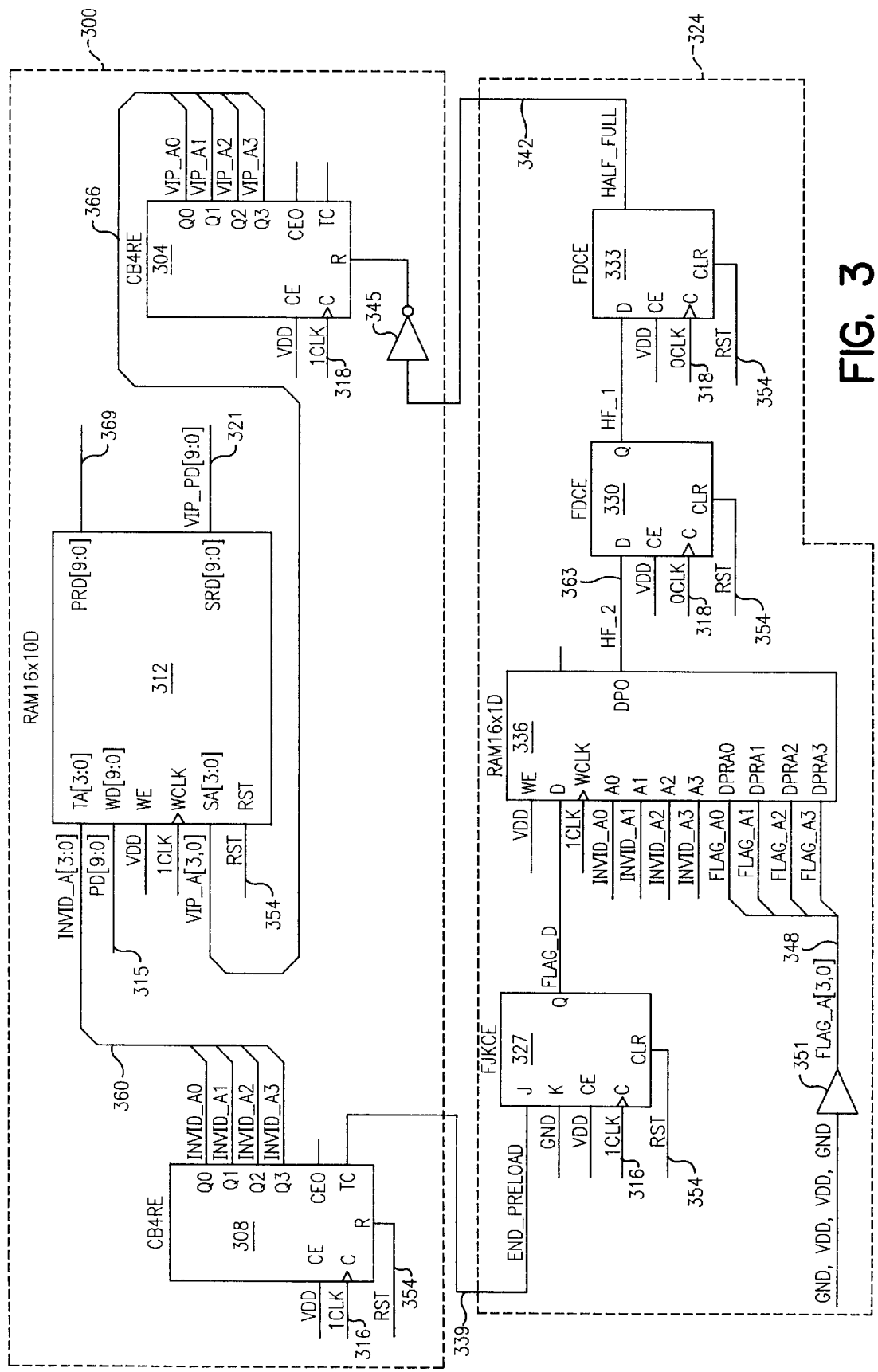
FIG. 3 shows a circuit implementation of the rubber band FIFO with a simple threshold using a dual-port RAM and three flip-flops.

The circuit schematic shown in FIG. 3 replaces the typical flag-control logic of the prior art with a particular embodiment of Applicant's invention using a dual port RAM as a memory element.

The main circuitry 300 of the FIFO is formed by output counter 304, input counter 308 and main dual-port RAM 312. Source counter or input counter 308 is clocked by the input (write) clock ICLK 316 and serves as a pointer into main dual-port RAM 312 where input (write) data PD[9:0] 315 is to be written. Destination or output counter 304 is clocked by the output (read) clock OCLK 318 and serves as a pointer into main dual-port RAM 312 where output (read) data VIP_PD[9:0] 321 is retrieved. The main RAM 120 of FIG. 1 in the embodiment of FIG. 3 is a dual-port RAM 312. The main dual-port RAM 312 is a specially designed memory component which permits independent inputting and outputting of data.

Applicant's initialization or FIFO flag circuit 324 includes flip-flops 327, 330, 333 and a flag dual-port RAM 336. The main circuitry 300 passes information to the flag circuit 324 through a connection END_PRELOAD 339 which connects an output of input counter 308 to an input of flip-flop 327. Information from flag circuit 324 is transferred to the main RAM 300 via a connection of signal HALF_FULL 342 from an output of flip-flop 333 through inverter 345 to a reset of output counter 304.

The flag dual-port RAM 336 is used as a programmable threshold detector. Its threshold is set by a threshold signal (which may be for example six) input into the output address lines FLAG_A[3:0] 348 of the flag dual-port RAM 336. The threshold signal may be input from a variety of sources such as a buffer 351. Flip-flop 327 is used for flag circuit 324 initialization. Flip-flops 330 and 333 are serially connected between the output of the flag dual port RAM 336 and the output counter 304 reset. These two flip-flops 330, 333 synchronize the output of the flag dual-port RAM 336 to the output clock signal OCLK 318 used by the output counter 304.

FIG. 4(A–H) shows a timing diagram of the circuit shown in FIG. 3 and should be considered in conjunction with FIG. 3.

The FIFO circuitry 100 must first be initialized by applying a reset signal to reset line 354. After the reset signal has been applied to reset line RST 354, the memory cells of the flag dual-port RAM 336 are cleared to '0' during the first sixteen input clock cycles applied to clock line ICLKs 316 (up to time A in FIG. 4B). During these first 16 clock cycles after reset, flip-flop 327 outputs on output line FLAG D 357 a '0' and input counter 308 outputs on input address lines INVID_A[3:0] 360 a four bit number counting from 0 to 15. During this period, a "0" is output on line FLAG_D 357. The "0" value is written to each flag dual-port RAM's 336 memory cell addressed by the input counter on line INVID_

A[3:0] 360. Thus during the first sixteen clock cycles, all of the flag dual-port RAMs memory cells are written with a "0".

Prior to the 6th input clock cycle on input clock line ICLK 316 (up to point B in FIG. 4A), flag dual-port flag RAM 336 outputs an undefined value, on output line HF_2 363. This value propagates through flip-flops 330 and 333, inverter 345, and counter 304. Thus during the first few clock cycles, output counter 304 outputs an undefined value on line VIP_A[3:0] 366, which in turn causes the output lines VIP_PD[9:0] 321 of dual-port RAM 312 to output undefined values.

During the pre-load phase, which begins with the 6th clock cycle after reset, a 0 is loaded into the threshold memory cell in flag dual-port RAM 336, which causes flag dual-port RAM 336 output line HF_2 363 to output a defined value of '0'. This value propagates through circuit flip-flops 330, 333, inverter 345 and output counter 304 causing lines VIP_A[3:0] 366 of output counter 304, to start counting from 0 (reference time C in FIG. 4B) to fifteen. During the last clock cycle of the preload period (the 16th clock cycle after reset ICLK 316, reference time D in FIG. 4B) the input counter 308 outputs a "1" on preload line END_PRELOAD 339 (at reference time A in FIG. 4B), which results in FLAG_D 357 assuming a value of '1' on the next input clock cycle(the 17th clock cycle).

Figure 4A:
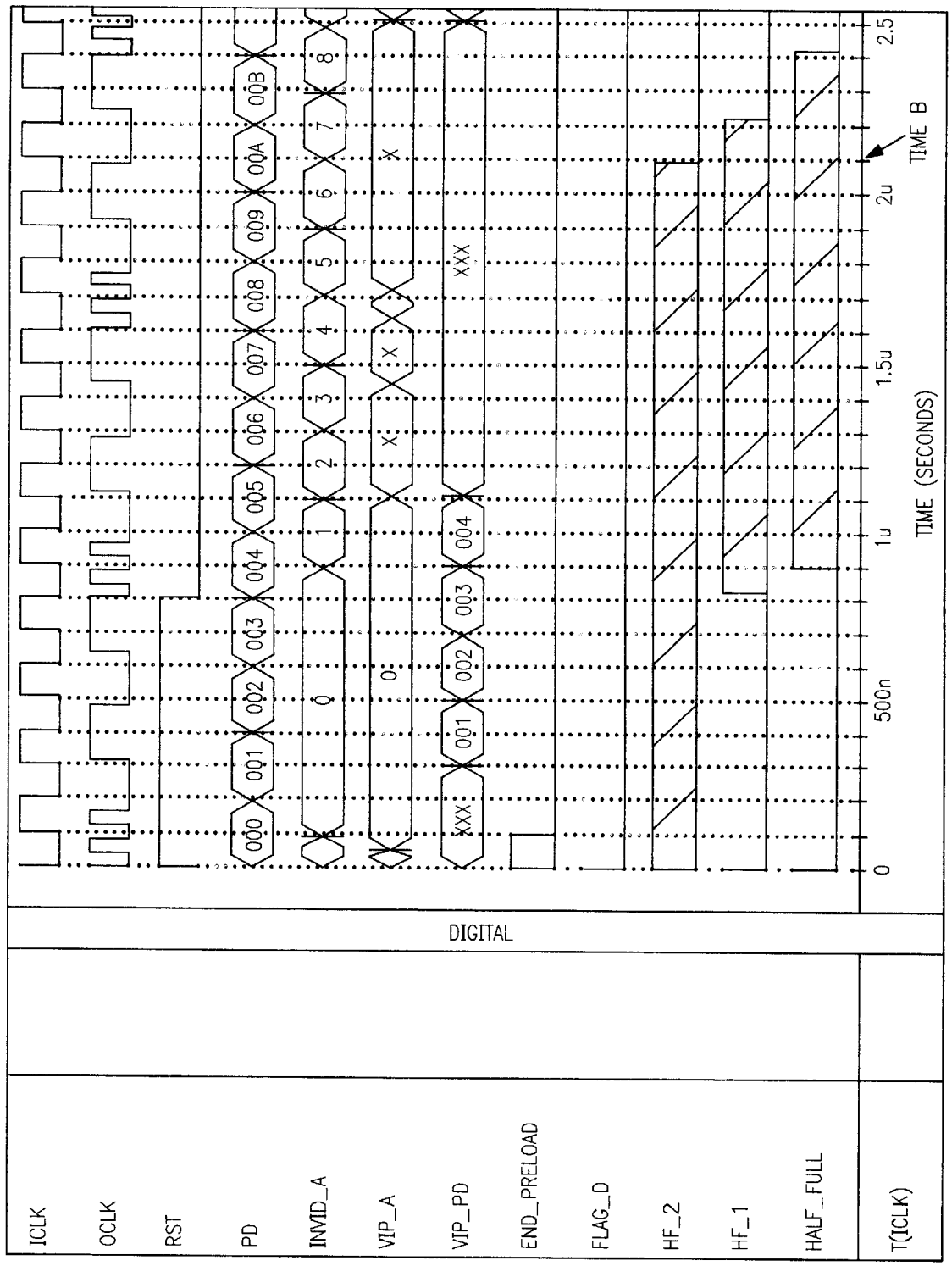
FIG. 4(A–H) is a timing diagram of the circuit shown in FIG. 3.
Figure 4B:
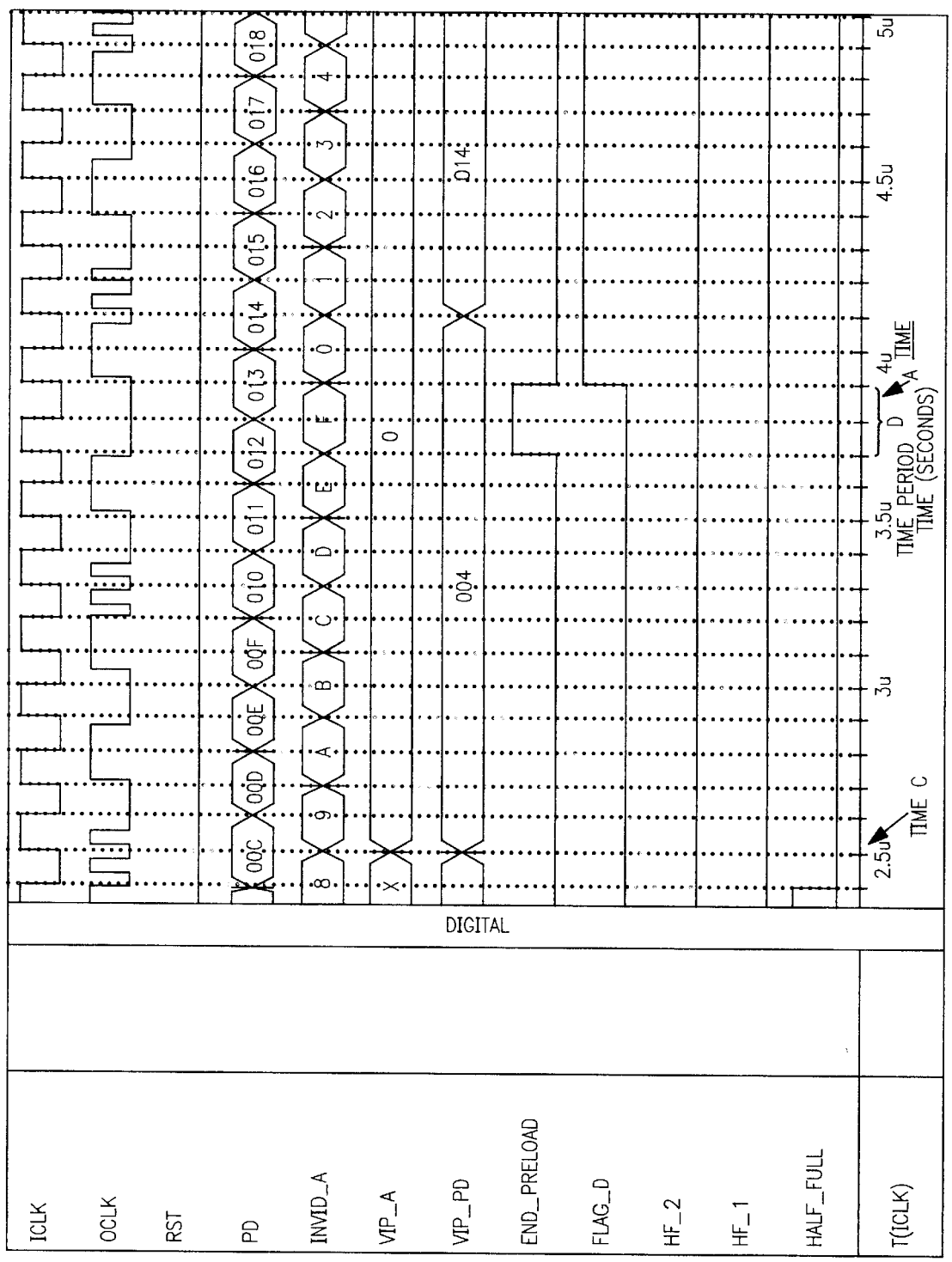

At the end of the preload period, (the 17th input clock cycle after the reset signal was applied, reference time A in FIG. 4B) the main FIFO dual-port RAM starts receiving data words and the signal on line FLAG_D 357 carries a value of '1'. Input counter 308 outputs on lines VID_A[3:0] 360 a count from 0 to 15. Each memory cell in the flag dual-port RAM 336 is thus successively assigned a value of '1'. Each clock cycle input clock on line ICLK 316, results in a word of data from the input system being written to the main dual-port RAM 312 memory cells addressed by input counter lines INVID_A[3:0] 360. On the 22nd input clock cycle since reset, on clock line ICLK 363 (at reference time E in FIG. 4C), a value of '1' is written to the threshold memory cell of flag dual-port RAM 336. The flag dual-port RAM 336 output line HF_2 363 outputs the value contained in the threshold memory cell address six which is "one". This value propagates through flip-flops 330, 333, and inverter 345 to the reset of output counter 304, causing output counter 304 to start counting from 0 to 15. As the output counter 304 begins to count, the main dual port RAM 312 begins to output data corresponding to the memory locations addressed by output counter 304.

Figure 4C:
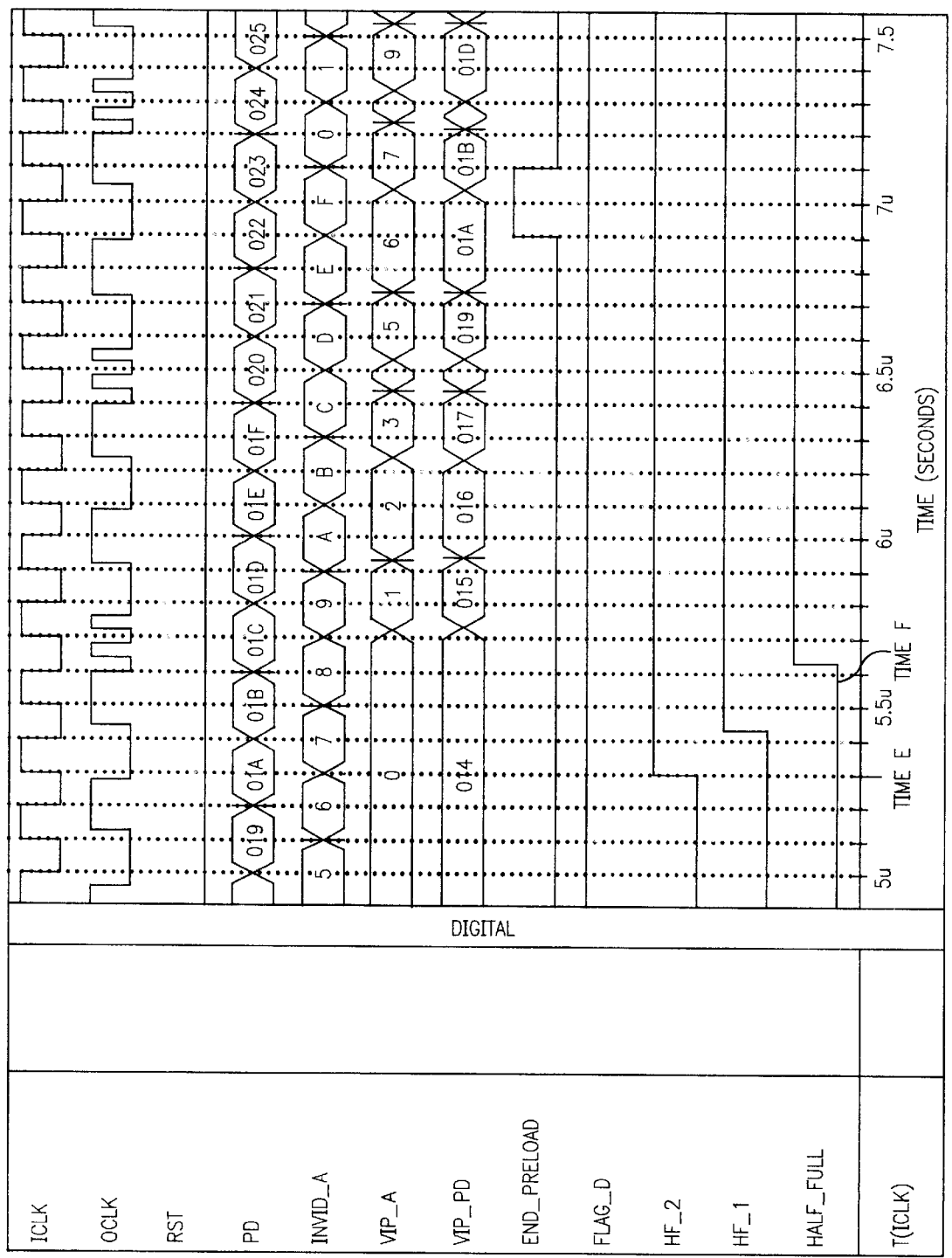
Figure 4D:
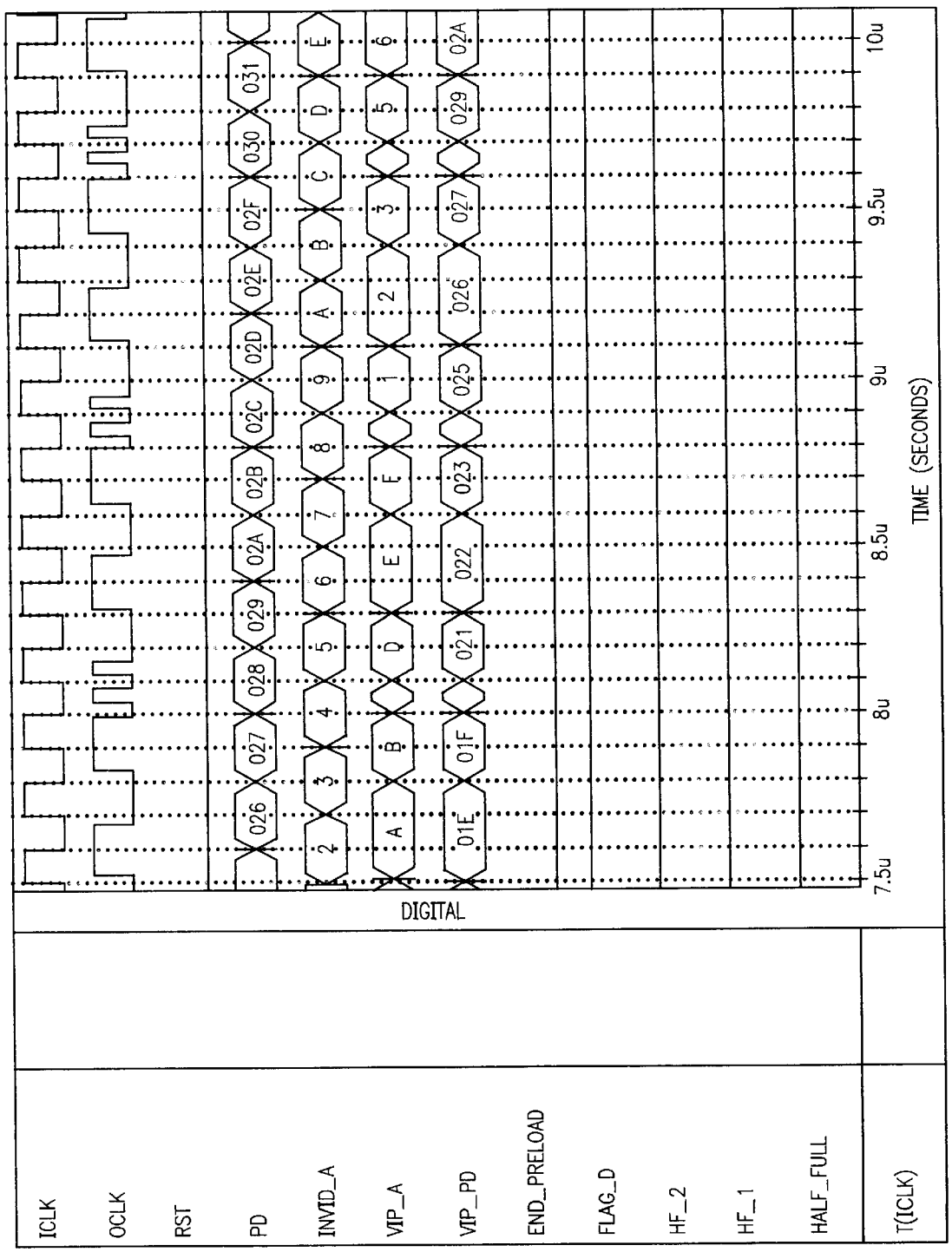
Figure 4E:
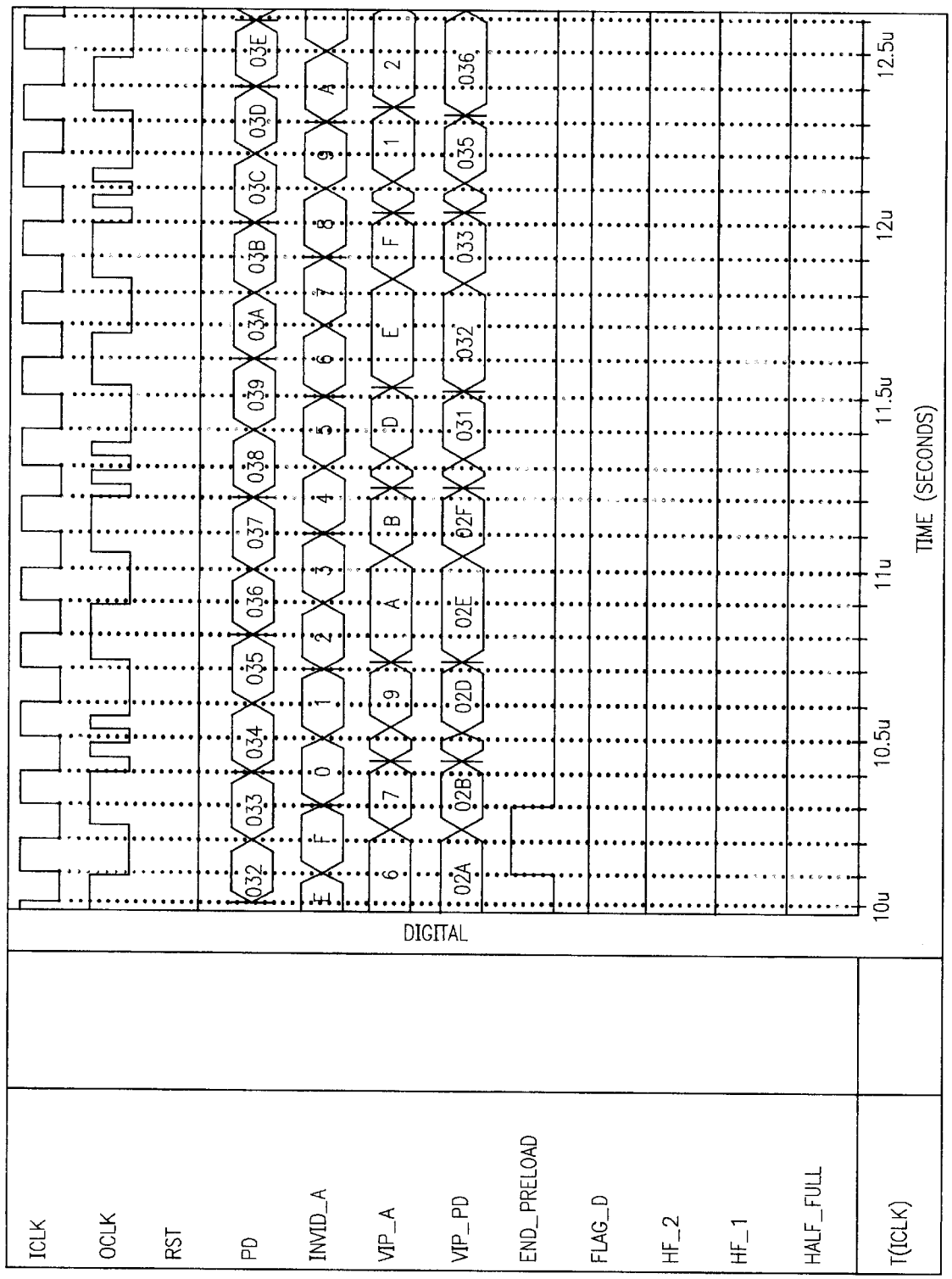
Figure 4F:
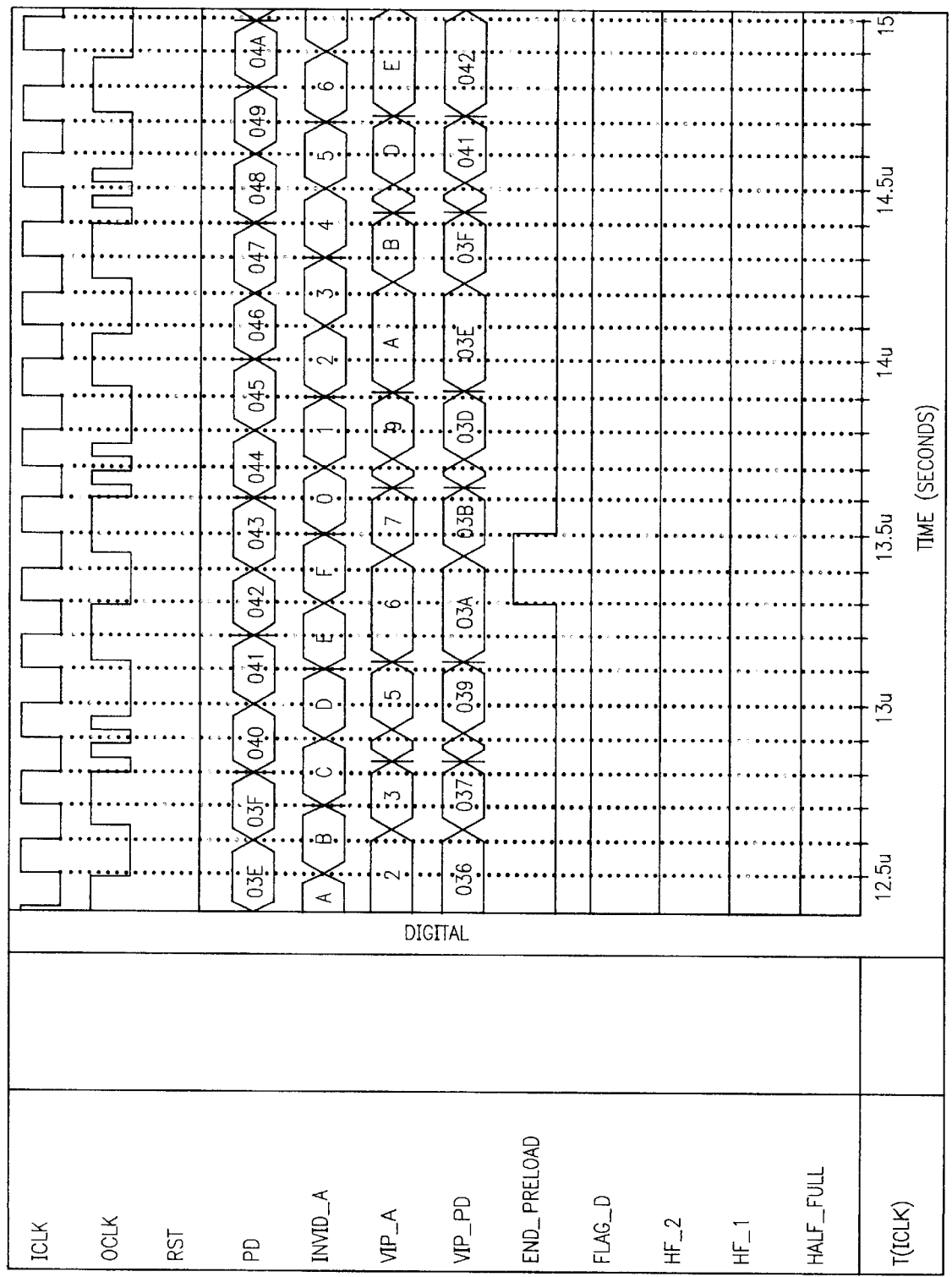
Figure 4G:
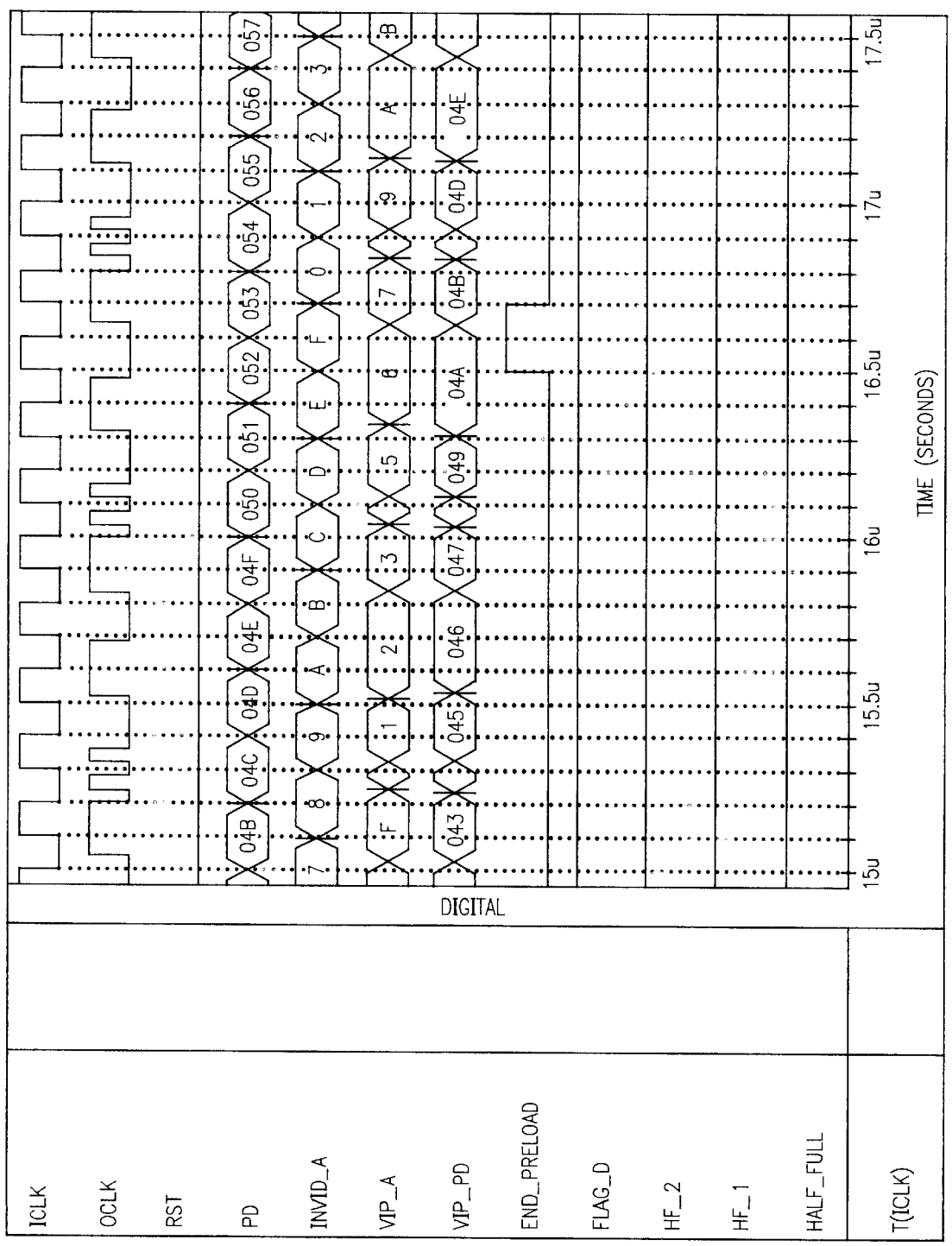
Figure 4H:
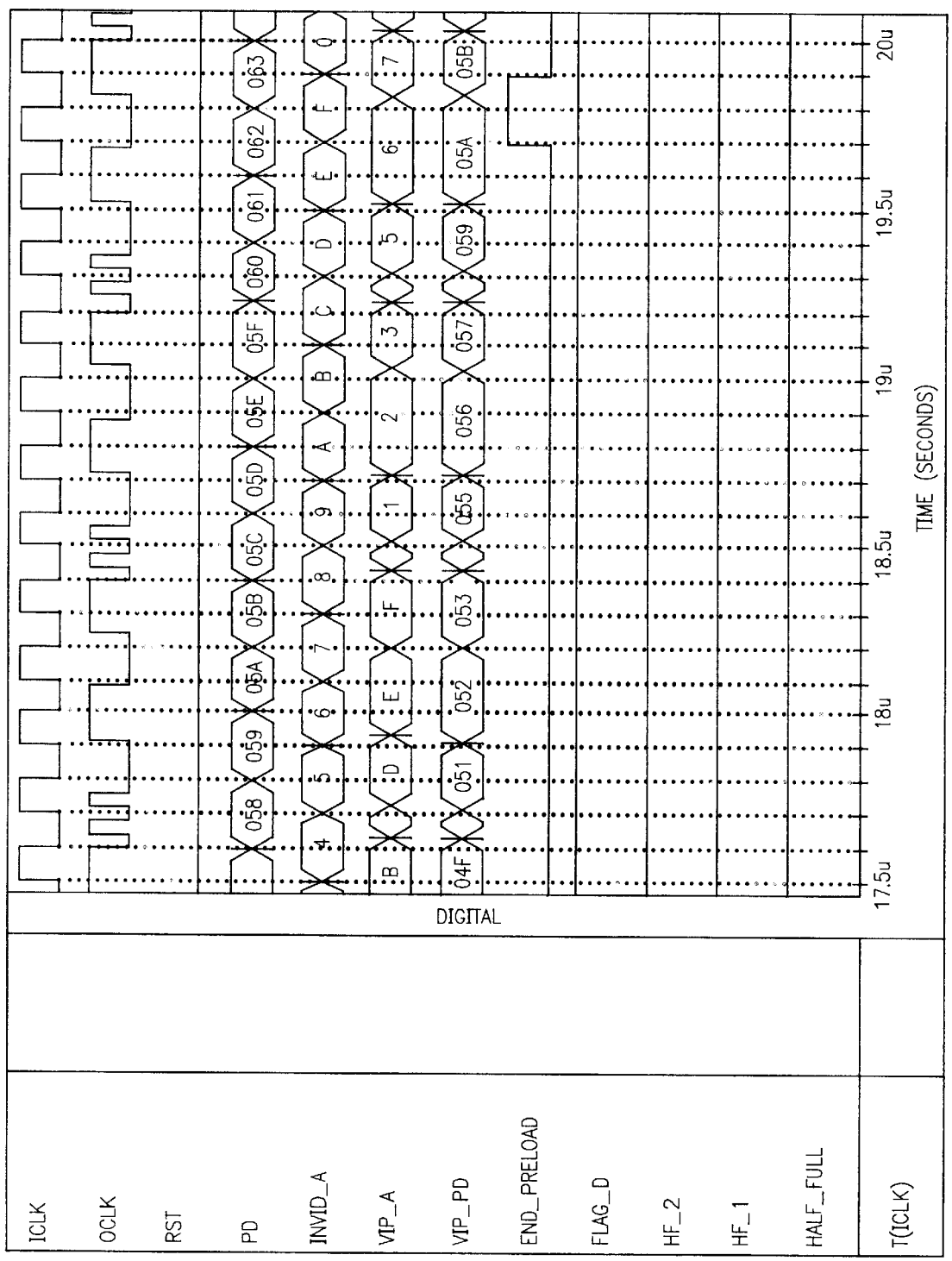

At reference time F in FIG. 4C, (approximately 2 output clock cycles 318 after the flag dual port RAM 336 indicates that threshold has been reached) the output counter 304 is reset by a signal on line HALF_FULL 312. After the output counter is reset, main dual-port RAM 312 outputs on line VIP_PD[9:0] 321 the contents of memory cells corresponding to the address identified by output counter 304. The contents of these memory cells were input on input bit lines PD[9:0] 315 when input counter 308 last counted the value being addressed by the output counter 304.

After the initialization process, each input clock cycle increments the input counter by one. During each input clock cycle a word of data on lines PD[9:0] 315 are stored in the memory cells of the main dual-port RAM 312 addressed by address lines INVID_A[3:0] 360. Each output clock cycle increments output counter 304 by one, and causes the main dual-port RAM 312 to output data addressed by the output counter on lines VIP_PD[3:0] 366.

Figure 5:
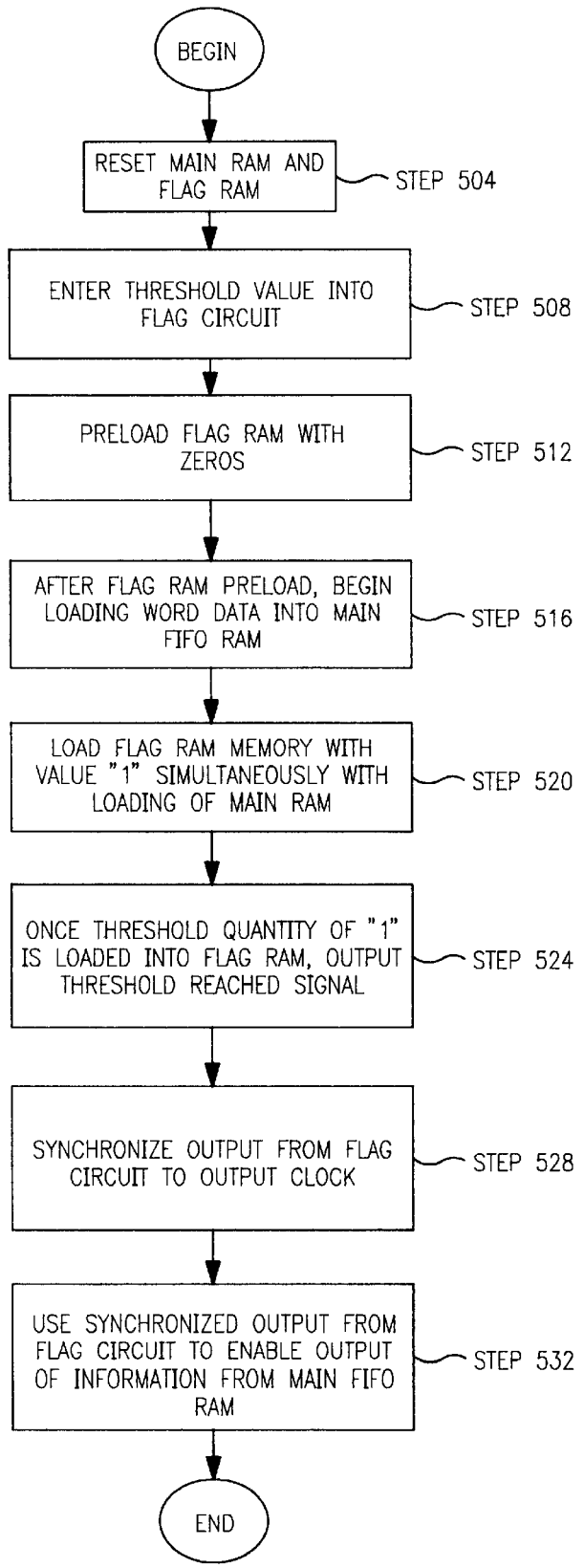
FIG. 5 is a flow-chart diagram of the procedures used in the preferred invention.

FIG. 5 is a flow-chart diagram of the procedures used in the circuit disclosed in FIG. 3. Both FLAG dual-port 336 RAM and main dual-port RAM 312 are reset such that the contents of both sets of memory are initially indeterminate (step 504). A threshold value which is either entered by the end user or transferred from a storage location is transmitted to the flag dual port RAM 336 (Step 508). This threshold value identifies an address location within the flag dual-port RAM 336 from which data will be output. Immediately after reset the threshold memory cell contains an indeterminate value and thus FLAG dual-port RAM 336 outputs an indeterminate value.

In the preload period, a predetermined constant, ('0' in the example) is entered into the FLAG dual-port RAM 336 memory locations indicated by the input address counter (step 512). After the preload period, the input address counter 308 is incremented after each source clock cycle. Each increment of address counter 308 results in a word of data being entered into the main FIFO memory location addressed by the input address counter 308 (step 516). Each word of data input into the main dual-port RAM 312 results in a corresponding unit of data being input into a corresponding address in the flag dual-port RAM 336 (step 520).

FLAG RAM 312 continues to output a value corresponding to the value stored in the threshold value memory location. Thus once a threshold quantity of data is loaded into flag RAM, the threshold memory location is assigned a "1" and an output reached signal is transmitted (step 524). The output from the FLAG dual-port RAM 336 is synchronized to the destination or output clock (step 528). Thus, flip-flops 330, 333 are used to adjust the output of the FLAG dual-port RAM 336 to be synchronized with the output clock. The synchronized data is inverted, and then transmitted to the reset of the output counter 304 (step 532). The output counter 304 identifies the address of data in the Main dual-port RAM 312 which is output to the destination circuit.

Initially, values output from the FLAG dual-port RAM 336 will be indeterminate. In the middle of the preload phase, when the threshold memory location is assigned a "0", a zero will be output by flag dual-port RAM 336. A 0 will continue to be output by flag circuit 324 until a threshold quantity of data has been transferred to the main RAM. When a threshold quantity of data has been transferred to main dual-port RAM 312, the flag circuitry 324 resets the output counter 304 and main dual-port RAM 312 begins to output data stored in memory locations addressed by the output counter 304. Thus the output terminal of the main dual port RAM 312 will initially lag the input terminal by a set number of clock cycles. Provided the input and output clocks are locked within certain parameters, the output of the main dual port RAM 312 will continue to lag the input.

The described invention is particularly well-suited to implementation in a specific device, known as a 4000E series FPGAs (field programmable gate arrays) from a manufacturer called Xilinx. It replaces the conventional flag input/output pointer comparison and synchronization logic with one memory unit and three flip-flops. The described example is particularly well suited for systems where the input and output clocks are fairly tightly locked, within about ±2000° of phase. However, these phase tolerances can be slackened if deeper dual-port RAMS and larger input/output pointers are used.

The described circuit can result in significant savings of circuit space and elements. For example, the Xilinx 4000E FPGAs can implement a 16-word by 1-bit dual-port RAM and two synchronizing flip-flops in a single CLB (Configurable Logic Block). A third flip-flop requires less than half a CLB. Thus the described flag control circuitry utilizing three flips flops, and one dual-port RAM, requires less than two CLBs to provide an appropriate threshold signal.

A conventional FIFO's comparison and synchronization logic requires 4-bit synchronization latches and control logic as well as a 4-bit comparator to provide an equivalent signal. The control logic for the synchronization latches alone requires more than two CLBs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A data transfer system configured to match data transfers from a first system with a first clock rate to a second system with a second clock rate, said data transfer system comprising:

a data store including a plurality of memory locations, each memory location providing temporary storage for a data segment and configured to temporarily store data segments being transferred from said first system to said second system;

an input terminal of said data store configured to accept data from said first system at said first clock rate;

an output terminal of said data store configured to output data to said second system at said second clock rate; and a control circuit coupled to in parallel with said data store, said control circuit, including a plurality of memory cells including at least one flag memory cell, each memory cell corresponding to a memory location, each memory cell receiving a data unit when a corresponding memory location receives a data segment, the control circuit signaling when a threshold amount of data has been input into said data store.

2. The data transfer system of claim 1 wherein said plurality of memory cells is a shift register, and a unit of data is transferred from a first memory cell to a second memory cell in the plurality of memory cells in response to each input from said first system.

3. The data transfer system of claim 1 wherein said data store is a dual port RAM.

4. The data transfer system of claim 3 wherein said plurality of memory cells is a dual port RAM which successively loads memory cells according to an address given by an input counter.

5. The data transfer system of claim 1 wherein said control circuit includes a counter as a delay element.

6. The data transfer system of claim 1 wherein the number of memory cells in said plurality of memory cells is at least equal to a number of words in said data store.

7. The data transfer system of claim 1 wherein at least one flip-flop is coupled between the output of said plurality of memory cells and the input of said data store, said flip-flop running on said second clock rate.

8. The data transfer system of claim 1 wherein the output of said control circuit is coupled to a counter reset, said counter reset configured to reset a counter coupled to output address lines of said data store.

9. The data transfer system of claim 1 wherein said data transfer system is an asynchronous FIFO circuit.

10. A method for generating a ready signal for a data transfer circuit which matches the output of a first circuit running at a first clock rate with the input of a second circuit running at a second clock rate, said method comprising the steps of:

applying a reset signal to a control circuit;

determining a threshold value based on whether said first clock rate is more likely to significantly lead or lag said second clock rate;

inputting said threshold value into said control circuit;

receiving a first word of data into a main memory of said data transfer circuit from said first circuit and inputting a bit of data into a first memory cell in a plurality of memory cells in the control circuit, the word of data remains in said main memory until the bit of data propagates to a flag memory cell; and generating a ready signal when the bit of data propagates to the flag memory cell.

11. The method of claim 10 wherein said ready signal is input into a reset input of a counter.

12. The method of claim 11, wherein said ready signal goes through at least one flip-flop clocked by said second clock before being input into the reset input of said counter.

13. The method of claim 11, wherein said counter is an output counter that identifies a memory address which hold s the data being output by said data transfer circuit.

14. The method of claim 10, wherein the generating of said ready signal based on said threshold value further comprises:

timing additional inputs of additional bits of data into the plurality of memory cells;

outputting the contents of one memory cell of said plurality of memory cells to a counter in said data transfer circuit.

15. An information processing system comprising:

a first computing unit including a first processor and a first clock running at a first clock rate;

a second computing unit including a second processor and a second clock running at a second clock rate; and a data transfer system configured to match data transfers from said first computing unit to said second computing unit, said data transfer system including: a data store including a plurality of memory locations, each memory location providing storage for a data word and configured to temporarily store the data word being transferred from said first computing unit to said second computing unit, an input terminal of said data store configured to accept the data word from said first computing unit at said first clock rate, an output terminal of said data store configured to output the data word to said second computing unit at said second clock rate, and a control circuit coupled to said data store, said control circuit including a plurality of memory cells including at least one flag memory cell, each memory cell corresponding to a memory location, each memory cell receiving a data unit when a corresponding memory location receives a word of data, the control circuit signaling when a threshold number of memory cells receives data unit.

16. The data transfer system of claim 1 wherein each memory cell in the plurality of memory cells corresponds to a memory unit in the data store for storing a word of data, each memory cell receiving a unit of data when a corresponding memory unit receives a word of data.

17. The data transfer system in claim 1 wherein the memory locations are nonconsecutive memory locations.

18. The data transfer system in claim 1 wherein the memory locations are consecutive memory locations.

* * * * *